US008836731B2

(12) United States Patent
Yanagawa

(10) Patent No.: US 8,836,731 B2
(45) Date of Patent: Sep. 16, 2014

(54) NON-VOLATILE STORAGE MEDIUM STORING A PORTABLE DEVICE CONTROL PROGRAM, AND METHOD OF CONTROLLING A PORTABLE DEVICE

(75) Inventor: Ryo Yanagawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 132 days.

(21) Appl. No.: 13/359,239

(22) Filed: Jan. 26, 2012

(65) Prior Publication Data

US 2012/0194531 A1    Aug. 2, 2012

(30) Foreign Application Priority Data

Jan. 31, 2011    (JP) ................................. 2011-019054

(51) Int. Cl.
*G09G 5/00*      (2006.01)
*G06F 3/01*      (2006.01)
*G06F 3/0485*    (2013.01)

(52) U.S. Cl.
CPC .............. *G06F 3/0485* (2013.01); *G06F 3/017* (2013.01); *G06F 2203/0381* (2013.01)
USPC ............... 345/684; 345/472; 74/5 R; 702/141

(58) Field of Classification Search
CPC .......................................... G09G 5/34–5/346
See application file for complete search history.

(56) References Cited

U.S. PATENT DOCUMENTS

2004/0036912 A1*  2/2004  Liou et al. .................... 358/1.16
2004/0210832 A1  10/2004  Iwanaga et al.
2005/0097479 A1*  5/2005  Takabe et al. ................. 715/851
2009/0069046 A1*  3/2009  Liu et al. ....................... 455/557
2009/0197635 A1*  8/2009  Kim et al. .................. 455/550.1
2010/0088583 A1*  4/2010  Schachter ..................... 715/206
2010/0156785 A1*  6/2010  Nakaoka ....................... 345/157
2010/0169097 A1*  7/2010  Nachman et al. ............. 704/275
2011/0102455 A1*  5/2011  Temple ........................ 345/619

FOREIGN PATENT DOCUMENTS

| JP | H09-230831 A | 9/1997 |
| JP | H10-254614 A | 9/1998 |
| JP | 2002-196881 A | 7/2002 |
| JP | 2005-044138 A | 2/2005 |
| JP | 2007-179565 A | 7/2007 |
| WO | 03/021475 A1 | 3/2003 |

OTHER PUBLICATIONS

Japan Patent Office, Notification of Reason for Refusal for Japanese Patent Application No. 2011-019054 (counterpart Japanese patent application), mailed Jan. 29, 2013.

* cited by examiner

*Primary Examiner* — David H Chu
(74) *Attorney, Agent, or Firm* — Baker Botts L.L.P.

(57) ABSTRACT

A non-volatile storage medium storing a control program readable by a computer of a portable device including a sensor to output detected information indicative of at least one of a movement and an attitude of the portable device, a data memory portion to store image data, and a display portion to display an image on the basis of the image data, wherein the control program enables the computer to function as: a partial area specifying portion to specify, as a partial image area, an area of a partial image that is a portion of the image represented by the image data, on the basis of at least one of the movement and attitude of the portable device indicated by the detected information; and a display control portion to display the partial image in the partial image area specified by the partial area specifying portion, on the display portion.

15 Claims, 10 Drawing Sheets

NON-VOLATILE STORAGE MEDIUM STORING A PORTABLE DEVICE CONTROL PROGRAM, AND METHOD OF CONTROLLING A PORTABLE DEVICE

CROSS REFERENCE TO RELATED APPLICATION

The present application claims the priority from Japanese Patent Application No. 2011-019054 filed Jan. 31, 2011, the disclosure of which is herein incorporated by reference in its entirety.

BACKGROUND OF THE INVENTION

1. Field of the Invention

The present invention relates to a non-volatile storage medium storing a control program for controlling a portable device so as to permit an easy scrolling operation of its display panel view, and a method of controlling the portable device.

2. Description of Related Art

There is known a technique for permitting an intuitive scrolling operation of a narrow display panel of an information device such as a portable or cellular phone. There is also known a technique wherein an image of a given area in a guide sheet having a multiplicity of coordinate indicator markers printed thereon to indicate respective two-dimensional coordinate positions is taken by a CCD camera of a portable phone, and the taken image is processed to recognize in a real-time fashion a positional relationship between the guide sheet and the CCD camera. This technique permits display view controls (such as scrolling and zooming operations) of displayed contents in response to a change of the positional relationship between the guide sheet and the CCD camera.

SUMMARY OF THE INVENTION

However, the technique described above requires preparation of the guide sheet for the cellular phone, and is not necessarily convenient for the user of the cellular phone. It is therefore an object of the present invention to provide techniques that can solve this inconvenience.

The object indicated above can be achieved according to the principle of this invention, which provides a non-volatile storage medium storing a control program readable by a computer of a portable device which includes a sensor configured to output detected information indicative of at least one of a movement and an attitude of the portable device, a data memory portion configured to store image data, and a display portion configured to display an image on the basis of the image data, wherein the control program enables the computer to function as: a partial area specifying portion configured to specify, as a partial image area, an area of a partial image that is a portion of the image represented by the image data, on the basis of the above-described at least one of the movement and the attitude of the portable device that are indicated by the detected information; and a display control portion configured to command the display portion to display the partial image in the partial image area specified by the partial area specifying portion.

BRIEF DESCRIPTION OF THE DRAWINGS

The above and other objects, features, advantages and technical and industrial significance of the present invention will be better understood by reading the following detailed description of preferred embodiments of the present invention, when considered in connection with the accompanying drawings, in which.

DETAILED DESCRIPTION OF THE PREFERRED EMBODIMENT

Figure 1:
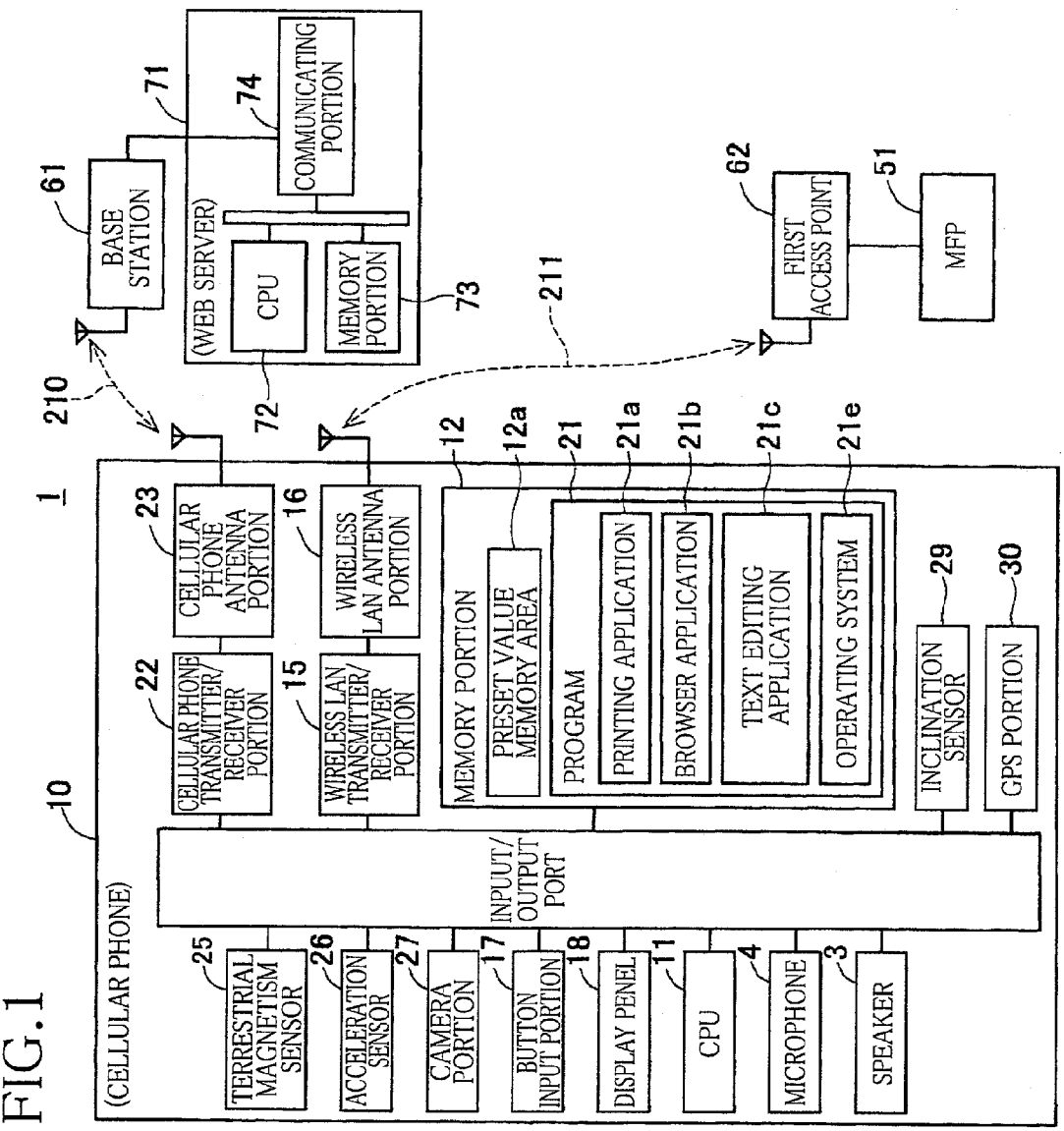
FIG. 1 is a flock diagram of a communication system 1.

Referring first to the block diagram of FIG. 1, there is shown a communication system 1 configured according to one embodiment of this invention. The communication system 1 includes a portable or cellular phone 10, an MFP (Multi-Function Peripheral) 51, a first access point 62, a web server 71, and a base station 61. The cellular phone 10 and the MFP 51 are operable to function as wireless LAN peripheral devices known in the art. The MFP 51 is the multi-function peripheral device having a plurality of functions including a printing function, a scanning function, a copying function and a facsimile function. The first access point 62 functions as one of wireless LAN access points known in the art.

The cellular phone 10 and the first access point 62 are capable of performing wireless communication (data communication using electric waves) as indicated at 211 in FIG. 1, according to an infrastructure mode of wireless LAN communication (a mode in which a plurality of wires LAN peripheral devices perform data communication with each other through access points). Namely, the cellular phone 10 obtains an access to the first access point 62, and is operable to perform data communication with the MFP 51 through the first access point 62 after the wireless communication 211 according to the infrastructure mode of the wireless LAN communication becomes possible. For example, the wireless LAN communication includes communications according to the IEEE802.11a/b/g/n standards.

An arrangement of the cellular phone 10 will be described. As shown in FIG. 1, the cellular phone 10 includes, as major components, a CPU (Central Processing Unit) 11, a memory portion 11, a wireless LAN transmitter/receiver portion 15, a wireless LAN antenna portion 16, a button input portion 17, a display panel 18, a cellular phone transmitter/receiver portion 22, a cellular phone antenna portion 23, a terrestrial magnetism sensor 25, an acceleration sensor 26, a camera portion 27, an inclination sensor (also called "gyroscope") 29, and a GPS portion 30. For audio communication (sound or voice transmission and reception), the cellular phone 10 also includes a speaker 3 and a microphone 4. The terrestrial magnetism sensor 25, acceleration sensor 26, inclination sensor (gyroscope) 29 and GPS portion 30 are examples of motion sensors.

Figure 7:
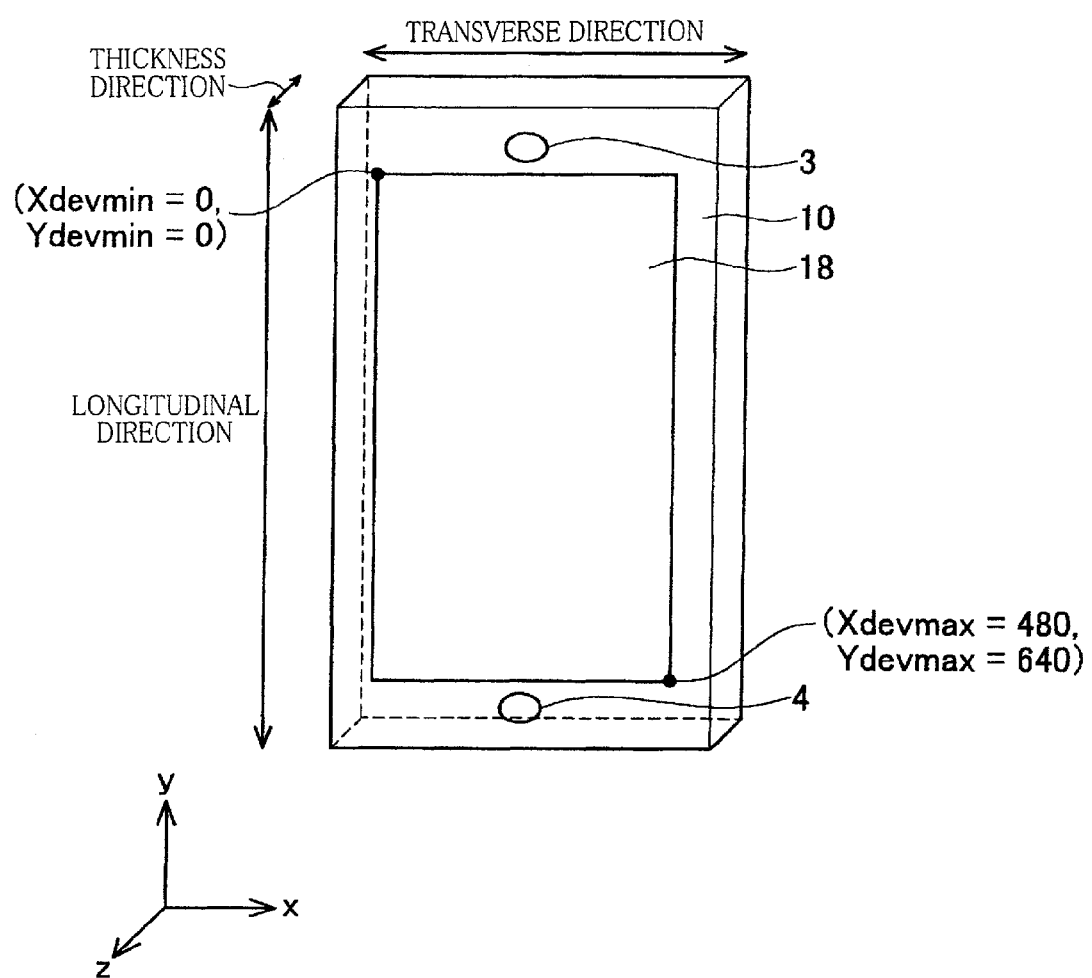
FIG. 7 is an illustrative perspective view of the cellular phone.

As shown in the illustrative perspective view of FIG. 7, the display panel 18 is provided on one of six surfaces of a housing of the cellular phone 10. For easy conversation through the cellular phone 10, apertures of the speaker 3 and microphone 4 are open in the surface (referred to as "first surface") of the housing on which the display panel 18 is provided, and are spaced apart from each other in a longitudinal direction of the cellular phone 10, by a distance almost equal to a distance between the ears and the mouse of the user. As indicated in FIG. 7, the housing has an x-y plane parallel to the first surface (on which the display panel 18 is provided). In other words, the first surface is parallel to an x-axis and a y-axis cooperating to define an x-y plane, and has two dimensional directions in the form of x-axis and y-axis directions parallel to the x-y plane. Namely, a transverse direction of the housing is the x-axis direction (one of the two dimensional directions), and the longitudinal direction described above is the y-axis direction (the other of the two dimensional directions), while a direction of thickness of the housing perpendicular to the x-y plane is the z-axis direction. It is noted here that these x, y and z axes directions are not strictly defined, in other words, are defined within a range of output accuracy of the motion sensors, and all of the x, y and z axes directions need not be used for applications of the cellular phone 10 and a selected one or ones of these directions may be used for the applications.

The CPU 11 controls various portions of the cellular phone 10 according to a program stored in the memory portion 12 and various signals transmitted and received through the wireless LAN transmitter/receiver portion 15. The memory portion 12 is constituted by a combination of a RAM (Random-Access Memory), a ROM (Read-Only memory), a flush memory, a HDD (hard disk), and a buffer provided in the CPU 11. The wireless LAN transmitter/receiver portion 15 performs the wireless communication 211, that is, transmits and receives various kinds of data in the form of digital signals, according to the infrastructure mode of the wireless LAN communication, through the wireless LAN antenna portion 16. The cellular phone transmitter/receiver portion 22 performs wireless communication with the base station 62, according to cellular phone communication standards, as indicated at 210 in FIG. 1, through the cellular phone antenna portion 23.

The memory portion 12 stores a program 21, and the CPU 11 processes the signals according to the program 21 stored in the memory portion 12. The program 21 includes a printing application 21a, a browser application 21b, a document editing application 21c and an operating system 21e.

The printing application 21a is an application for the cellular phone 10 to command the MFP 51 to perform a printing processing operation. The browser application 21b is an application for displaying web data on the display panel 18. The CPU 11 performs processing operations according to the browser application 21b, to obtain the web data from the web server 71, to store the web data in the memory portion 12, and to display images represented by the web data in the memory portion 12, on the display panel 18. The document editing application 21c is an application for creating, editing and retaining files consisting of character information (documents), namely, document files.

The operating system 21e is a program providing basic functions utilized commonly for the printing application 21a and browser application 21b. The operating system 21e includes a program for communication through the cellular phone transmitter/receiver portion 22, and a program for the wireless communication 211 through the wireless LAN transmitter/receiver portion 15. Further, the operating system 21e is also a program providing an API (Application Programming Interface) for each of the programs to obtain information calculated by the terrestrial magnetism sensor 25, acceleration sensor 26, inclination sensor 29 and GPS portion 30.

The memory portion 12 also stores velocity information vx, vy and vz. The memory portion 12 has a preset value memory area 12a, which stores velocity threshold values, etc. described below. The velocity threshold values may be stored in advance in the memory portion 12, by the user.

The button input portion 17 is an input receiving portion for receiving manual operations by the user of the cellular phone 10. The button input portion 17 a touch panel formed integrally with the display panel 18. The display panel 18 is configured to display various kinds of functional information. The terrestrial magnetism sensor 25 is a sensor capable of detecting the terrestrial magnetism to thereby detect a direction in which the cellular phone 10 extends from one of its upper and lower ends toward the other. The acceleration sensor 26 is a sensor capable of detecting a positional change of a pendulum to thereby measure an acceleration value of the cellular phone 10. The camera portion 27 is provided with CCDs configured to take a picture in a predetermined area, and obtain corresponding image data. The inclination sensor 29 is a sensor capable of measuring an angle of inclination of the cellular phone 10 with respect to the horizontal plane. As described above, the operating system 21e provides the API (Application Programming Interface) for each of the programs to obtain the acceleration value measured by the acceleration sensor 26, the image data obtained by the camera portion 27, and the angle of inclination obtained by the inclination sensor 29.

An arrangement of the web server 71 will be described. The web server 71 includes, as major components, a CPU 72, a memory portion 73 and a communication portion 74. The web server 71 is a device which provides client devices in the relevant network, with its web page data (HTML data and reference image data) and its various functions. The web server 71 is capable of performing the wireless communication 210 with the cellular phone 10 through the base station 61. The CPU 72 performs various control functions, and the memory portion 73 stores various kinds of data, while the communication portion 74 performs the wireless communication 210 with the cellular phone 10 for transmission and reception of various kinds of information.

(Operation of Printing Application 21a)

Figure 2:
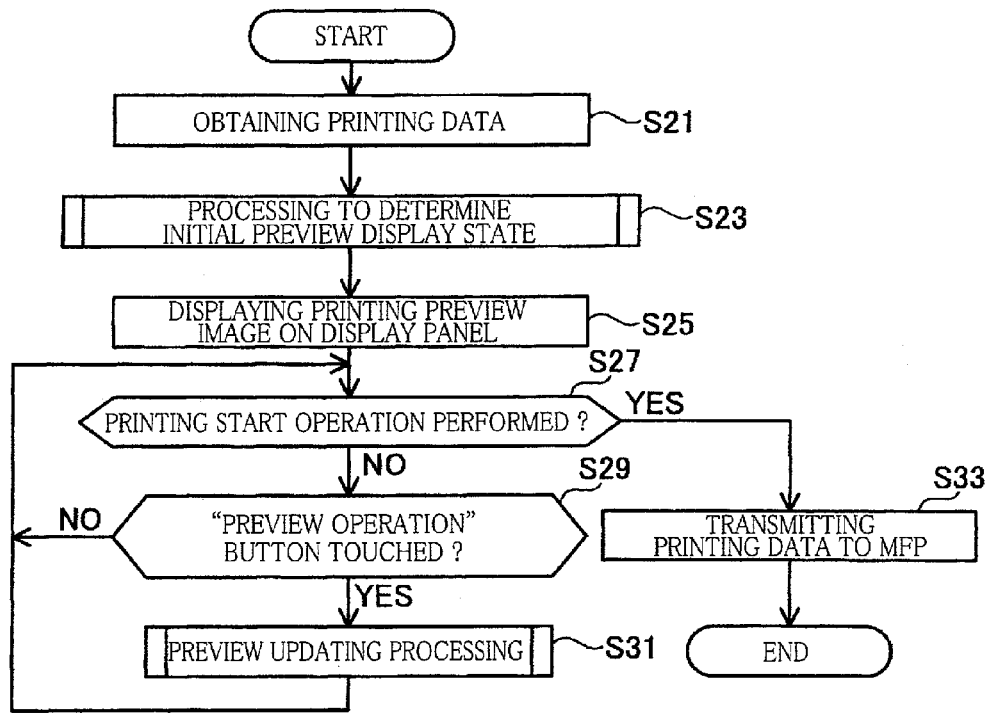
FIG. 2 is a flow chart illustrating a control routine of a cellular phone.
Figure 3:
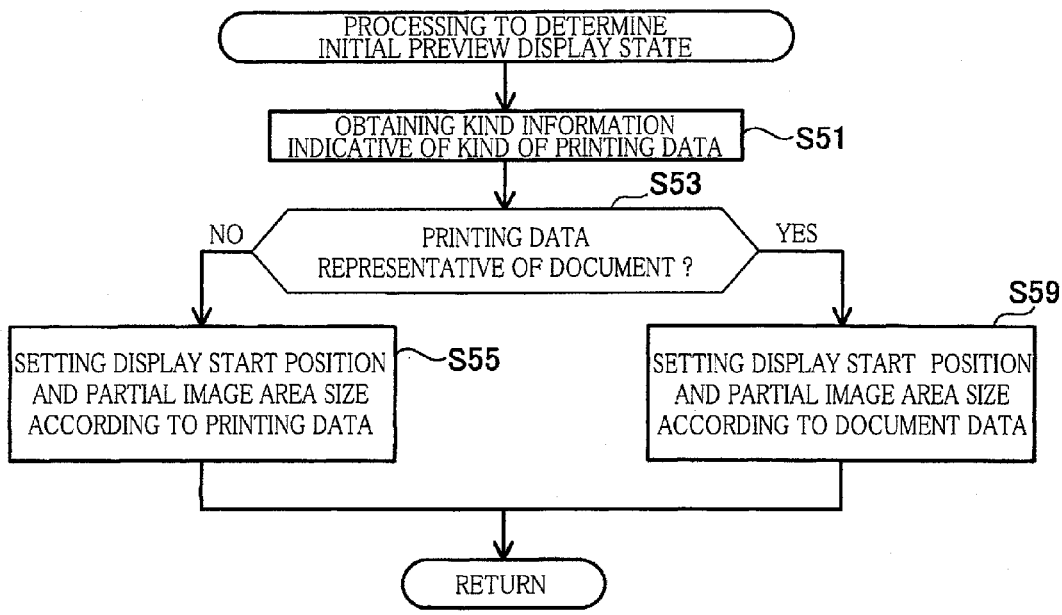
FIG. 3 is a flow chart illustrating a sub-routine executed in the control routine of FIG. 2.

An operation of the communication system 1 according to the present embodiment will be described by reference to FIGS. 2-14. Initially, a control routine for the cellular phone 10 to command the MFP 51 to perform a printing operation according to the printing application 21a will be described by reference to the flow chart of FIG. 2. Upon operation of the user through the button input portion 17 to start the printing application 21a, the CPU 11 starts the printing application 21a, so that the control routine of FIG. 2 is initiated with step S21 in which the CPU 11 obtains printing data for the MFP 51 to perform the printing operation. The printing data are defined as data including not only data representative of photographs and figures (drawings), but also data representative of documents. For instance, the printing data include not only bit map data and JPEG data, but also data generated on the basis of document editing software. An operation to obtain web data as the printing data from the web server 71 will be described by way of example. The CPU 11 obtains from the web server 71 the web data specified by URL (Uniform Resource Locator) input by the user. The CPU 11 stores the obtained web data in the memory portion 12 as the printing data.

Then, the control flow goes to step S23 in which the CPU 11 implements a processing to determine an initial preview display state. This processing to determine the initial preview display state will be described by reference to the flow chart of FIG. 3. In step S51, the CPU 11 obtains kind information of the printing data. For example, the kind information of the printing data includes an extension and a header that are appended to the printing data.

The control flow then goes to step S53 in which the CPU 11 recognizes the kind (photograph or figures; or document) of the printing data, on the basis of the obtained kind information of the printing data. Namely, step S53 is provided to determine whether the printing data represent a document or not. Where the kind information of the printing data is the expander information such as ".jpg" or ".png", for example, the CPU 11 recognizes that the printing data represent a photograph or figure (drawing). Where the kind information is the expander information such as ".txt", the CPU 11 recognizes that the printing data represent a document (text). Where the header information includes the kind information of the printing data, the CPU 11 reads out the kind information portion from the header information to recognize the kind of the printing data. If the CPU 11 recognizes that the printing data represent a photograph or figure, that is, if a negative determination (NO) is obtained in step S53, the control flow goes to step S55.

Figure 8:
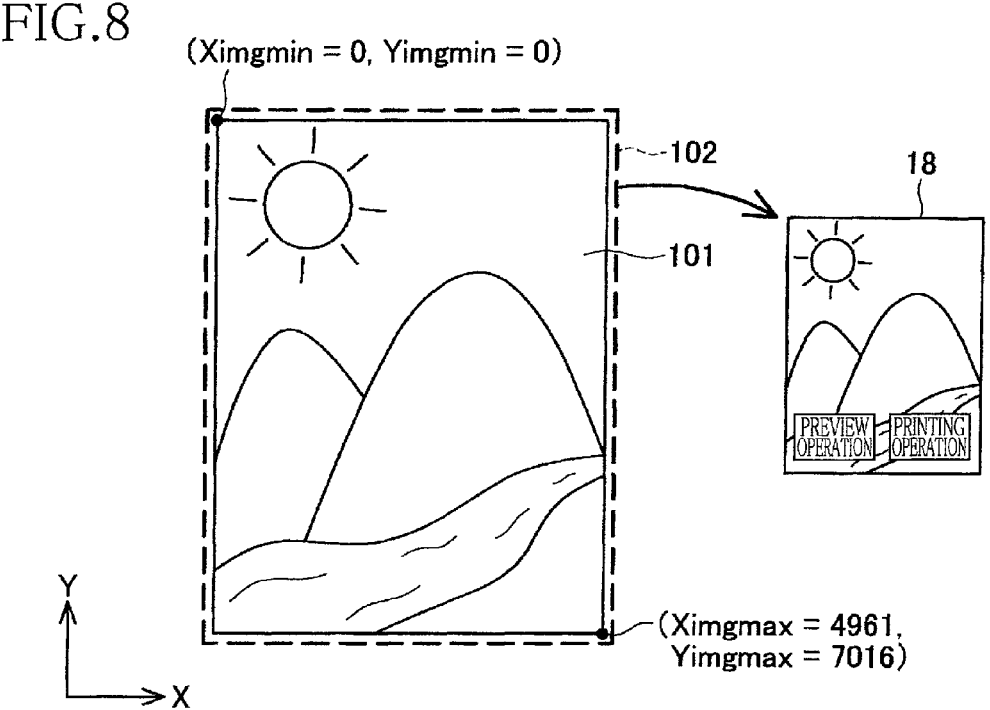
FIG. 8 is a view showing a printed image, and a portion of the printed image.

In step S55, the CPU 11 sets a display start position and the size of a partial image area so that a printing preview image corresponding to an entirety of a printing image to be printed on a recording medium according to the printing data is displayed in an entire display area of the display panel 18, as shown in FIG. 8 by way of example. The display start position is selected at a desired position in the printing image, which corresponds to a point of origin of an area of display of the printing preview image (partial image area) on the display panel 18.

Described more specifically, where an image is printed at a printing pitch of 600 dpi in an entire area of a recording medium of A4 size (210 mm×297 mm), the CPU 11 obtains bit map data of 600 dpi for printing the image on the A4-size recording medium, on the basis of the printing data, and stores the obtained bit map data in a bit map memory of the memory portion 12. The bit map data may be obtained by converting the printing data, or extracting the bit map data from the printing data. Where the transverse direction of the image to be printed on the A4-size recording medium is defined as an X-axis direction while the longitudinal direction of the printing image is defined as a Y-axis direction, an upper left point of origin of the printing image is defined as (Ximgmin=0 dot, Yimgmin=0 dot) while a lower right end point of the printing image is defined as (Ximgmax=4961 dot, Yimgmax=7016 dot), wherein Ximgmin and Ximgmax represent X-axis coordinate values while Yimgmin and Yimgmax represent Y-axis coordinate values. In this case, a multiplicity of bits corresponding to respective picture elements at respective coordinate positions from the point of origin through the end point are stored in the bit map memory. On the other hand, the entire display area of the display panel 18 has an upper left point of origin defined as (Xdevmin=0 dot, Ydevmin=0 dot) and a lower right end point defined as (Xdevmax=480 dot, Ydevmax=640 dot), as indicated in FIG. 7. In the present example, the CPU 11 determines the size (4961 dots×7016 dots) of the entire printing image to be the size of the partial image area and stores this size of the partial image area in the memory portion 12, and stores the display start position (0 dot, 0 dot) in the memory portion 12. As a result, the printing preview image corresponding to the entire printing image is displayed in the entire display area of the display panel 18 such that the upper left point of origin of the display area corresponds to the upper left point of origin of the printing image. Then, the control flow goes to step S25 of FIG. 2.

Figure 9:
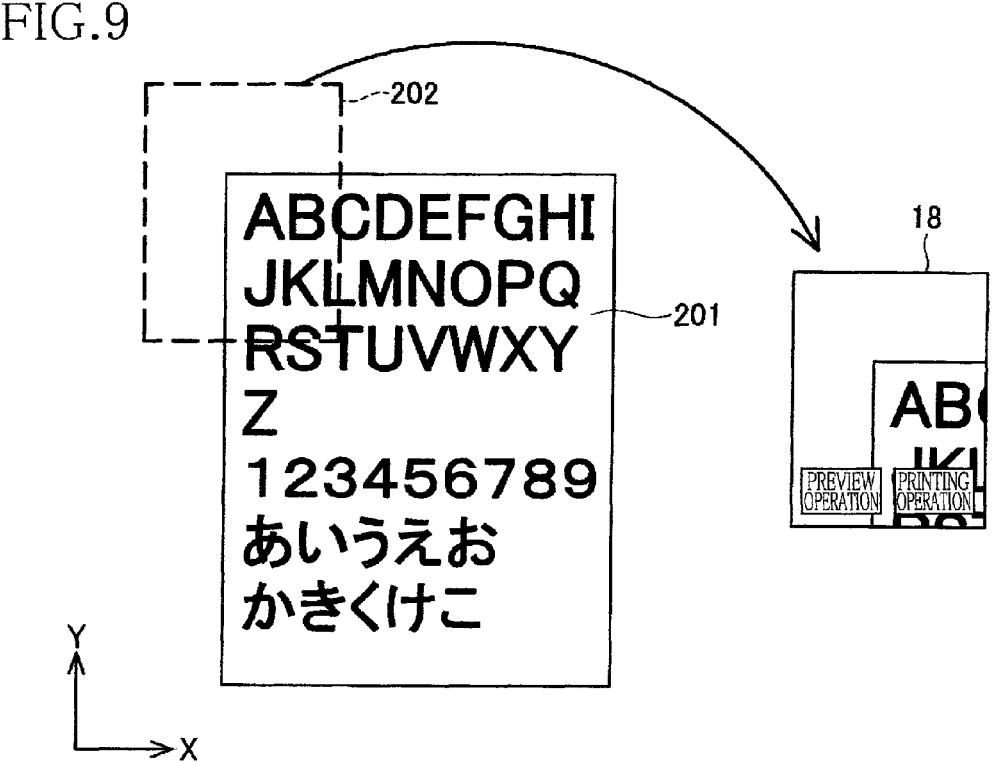
FIG. 9 is a view showing another printed image, and a portion of this printed image.

If it is determined in step S53 that the printing data represent a document, that is, if an affirmative determination (YES) is obtained in step S53, the control flow goes to step S59 in which the CPU 11 sets the display start position and size of the partial image area so that the size of characters included in the printing preview image corresponding to the printing image to be printed according to the document data is equal to the size of characters included in the printing image to be printed on the recording medium, and so that a point of start of the printing preview image corresponding to a point of start of rows of characters of the printing image (the upper left point of origin of the printing image where the rows of characters to be displayed according to the document data are parallel to the X axis, for instance) is located at a center position of the display area of the display panel 18, as indicated in FIG. 9.

Described more specifically, the CPU 11 obtains in step S59 the bit map data of 600 dpi for printing the document on the A4-size recording medium, on the basis of the printing data, and stores the obtained bit map data in the bit map memory. In the present case, a multiplicity of bits corresponding to respective picture elements at respective coordinate positions from the upper left point of origin (Ximgmin=0, Yimgmin=0) of the printing image through the lower right end point (Ximgmax=4961, Yimgmax=7016) of the printing image are stored in the bit map memory. Then, the CPU 11 calculates the size of the partial image area on the basis of a ratio of the size (4961 dots×7016 dots) of the printing image to the size (480 dots×640 dots) of the display area of the display panel 18. For example, the CPU 11 calculates the size of the partial image area to be equal to 1/10 of the size of the printing image, on the basis of the ratio of about 10.335 of the dimensions (4961/480) of the printing image and the partial image area in the X-axis direction. Accordingly, the CPU 11 stores, in the memory portion 12, the calculated size (496 dots×701 dots) of the partial image area which is 1/10 of the size of the entire printing image, and the display start position (−248 dot, −350 dot). As a result, the printing preview image is displayed on the display panel 18 such that the upper left point of the printing preview image (partial image area) is located at the center position of the entire display area of the display panel 18. Then, the control flow goes to step S25 of FIG. 2.

In step S25, the CPU 11 commands the display panel 18 to display the printing preview image. Described more specifically, the CPU 11 commands the display panel 18, using the API provided by the operating system 21e, to display the bit map data, at the picture elements at respective coordinate positions from the upper left point of origin (Xdevmin=0, Ydevmin=0) of the display area of the display panel 18 through the lower right end point (Xdevmax=−480, Ydevmax=640). Namely, the printing preview image is displayed (as an initial printing preview image) in the entire display area of the display panel 18. Where the printing data represent a photograph or figure as in the case of FIG. 8, the initial printing preview image is displayed on the display panel 18, such that the size of the initial printing preview image is reduced to permit the printing preview image to be displayed within the entire display area of the display panel 18, so that the user can recognize the entirety of the image at a glance. Where the printing data represent a document as in the case of FIG. 9, on the other hand, an upper left corner portion 202 of the printing image 201 is displayed as an initial preview image on the display panel 18, such that the size of the characters included in the initial preview image is almost equal to the size of the characters included in the printing image 201 to be printed on the recording medium according to the document data, to prevent contraction of the characters in the initial preview image, and consequent difficulty of reading of the characters.

The control flow then goes to step S27 in which the CPU determines whether an operation to start the printing operation has been performed by the user. This determination may be made by determining whether a "PRINTING OPERATION" button displayed on the display panel 18 has been touched by the user. If the operation to start the printing operation has been performed, that is, if an affirmative determination (YES) is obtained in step S27, the control flow goes to step S33 in which the CPU 11 transmits the printing data to the MFP 51 through the wireless communication 211. On the basis of the printing data received from the cellular phone 10, the MFP 51 prints the corresponding image on the recording medium. In this case, one cycle of execution of the control routine of FIG. 2 is terminated.

If the operation to start the printing operation has not been performed, that is, if a negative determination (NO) is obtained in step S27, on the other hand, the control flow goes to step S29 in which the CPU 11 determines whether a "PREVIEW OPERATION" button displayed on the display panel 18 has been touched by the user. If the "PREVIEW OPERATION" button has not been touched, that is, if a negative determination (NO) is obtained in step S29, the control goes back to step S27. If the "PREVIEW OPERATION" button has been touched, that is, if an affirmative determination (YES) is obtained in step S29, the control goes to step S31 in which implements a preview updating processing, and then goes back to step S27. Thus, the preview updating processing in step S31 is repeatedly implemented as long as the "PREVIEW OPERATION" button is kept touched.

(Preview Updating Processing)

Figure 4:
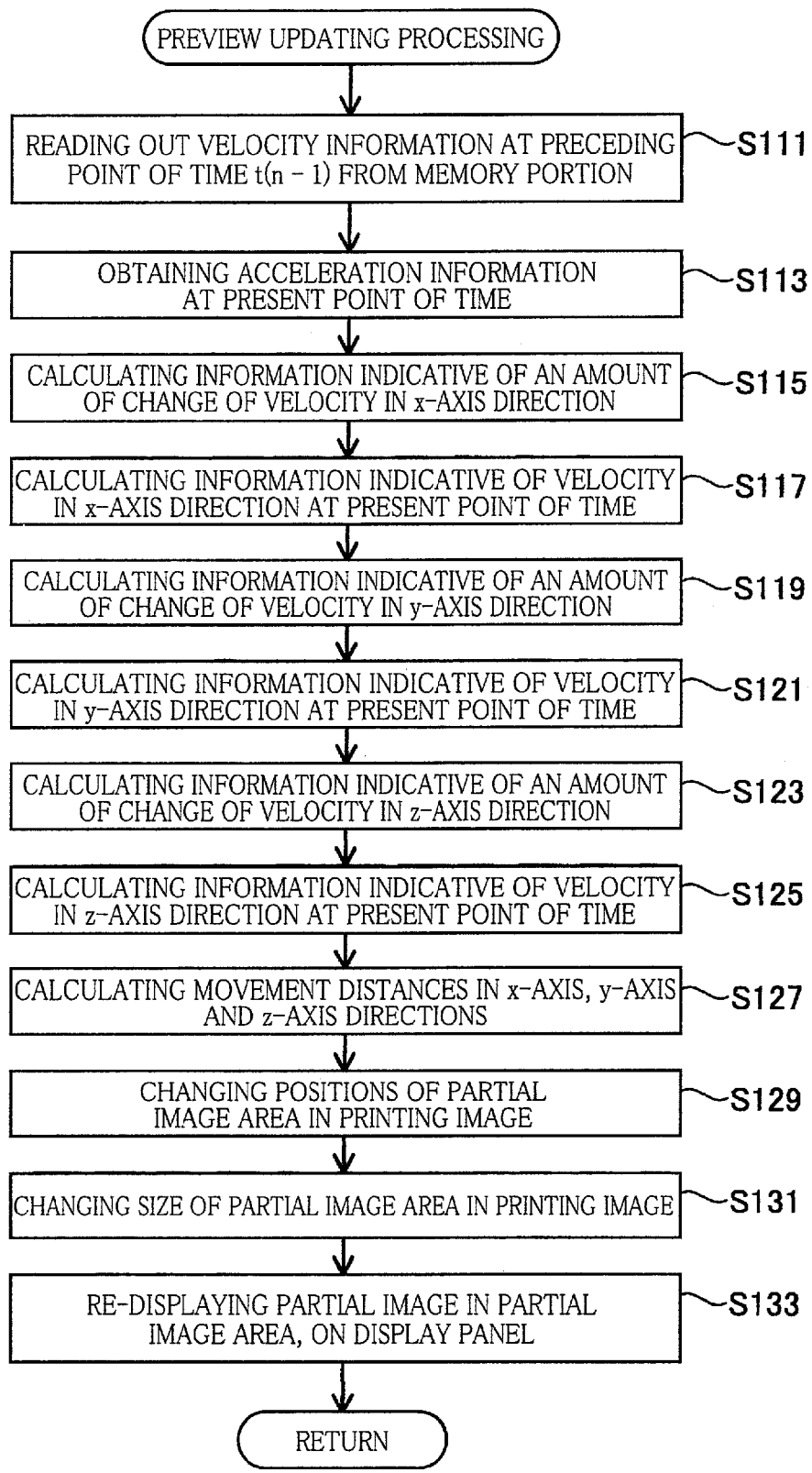
FIG. 4 is a flow chart illustrating another sub-routine executed in the control routine of FIG. 2.

Referring to the flow chart of FIG. 4, the preview updating processing will be described. It is noted here that a period of repetition of the preview updating processing, a present point of time, and a preceding point of time are respectively represented by $\Delta T$, $t(n)$ and $t(n-1)$. The preceding point of time $t(n-1)$ is a point which is prior to the present point of time $t(n)$ by the period $\Delta T$. The control flow illustrated in FIG. 4 is initiated with step S111 in which the CPU 11 reads out velocity information $vx(t(n-1))$, $vy(t(n-1))$ and $vz(t(n-1))$ from the memory portion 12. The velocity information $vx(t(n-1))$ represents a velocity in the x-axis direction at the preceding point of time $t(n-1)$, and the velocity information $vy(t(n-1))$ represents a velocity in the y-axis direction at the preceding point of time $t(n-1)$, while the velocity information $vz(t(n-1))$ represents a velocity in the z-axis direction at the preceding point of time $t(n-1)$.

The control flow then goes to step S113 in which the CPU 11 obtains acceleration information $ax(t(n))$, $ay(t(n))$ and $az(t(n))$ from the acceleration sensor 26, and stores the obtained acceleration information in the memory portion 12. The acceleration information $ax(t(n))$ represents an acceleration value in the x-axis direction at the present point of time $t(n)$, and the acceleration information $ay(t(n))$ represents an acceleration value in the y-axis direction at the present point of time $t(n)$, while the acceleration information $az(t(n))$ represents an acceleration value in the z-axis direction at the present point of time $t(n)$1

In the next step S115, the CPU 11 calculates change amount information $dvx(t(n))$ indicative of an amount of change of the velocity in the x-axis direction during a time period from the preceding point of time $t(n-1)$ to the present point of time $t(n)$. The change amount information $dvx(t(n))$ is obtained according to the following Equation (1):

$$dvx(t(n))=ax(t(n))\times \Delta t \qquad (1)$$

In the next step S115, the CPU 11 calculates the velocity information $vx(t(n))$ at the present point of time $t(n)$. The velocity information $vx(t(n))$ is obtained according to the following Equation (2):

$$vx(t(n))=vx(t(n-1))+dvx(t(n)) \qquad (2)$$

The calculated velocity information $vx(t(n))$ is temporarily stored in the memory portion 12.

In the next step S119, the CPU 11 calculates change amount information $dvy(t(n))$ indicative of an amount of change of the velocity in the y-axis direction during the period from the preceding point of time $t(n-1)$ to the present point of time $t(n)$. In the next step S121, the CPU 11 calculates the velocity information $vy(t(n))$ at the present point of time $t(n)$, and temporarily stores the calculated velocity information $vy(t(n))$ in the memory portion 12.

In the next step S123, the CPU 11 calculates change amount information $dvz(t(n))$ indicative of an amount of change of the velocity in the z-axis direction during the period from the preceding point of time $t(n-1)$ to the present point of time $t(n)$. In the next step S125, the CPU 11 calculates the velocity information $vz(t(n))$ at the present point of time $t(n)$, and temporarily stores the calculated velocity information $vz(t(n))$ in the memory portion 12. The velocity information $vy(t(n))$ and the velocity information $vz(t(n))$ are calculated according to equations similar to the above-indicated Equation (1).

Then, the control flow goes to step S127 in which the CPU 11 calculates movement distances $sx(t(n))$, $sy(t(n))$ and $sz(t(n))$. The movement distance $sx(t(n))$ is a distance of movement of the cellular phone 10 from a reference position thereof at the present point of time $t(n)$ in the x-axis direction. The reference position is a position of the cellular phone 10 at the point of time when which the "PREVIEW OPERATION" button is touched. The movement distance $sx(t(n))$ is calculated by summing distances of movement of the cellular phone 10 in the positive and negative directions along the x-axis. The movement distance $sy(t(n))$ is a distance of movement of the cellular phone 10 from the reference position at the present point of time $t(n)$ in the y-axis direction, and the movement distance $sz(t(n))$ is a distance of movement of the cellular phone 10 from the reference position at the present point of time $t(n)$ in the z-axis direction.

In the next step S129, the CPU 11 changes the display start positions in the printing image, on the basis of the movement distances $sx(t(n))$ and $sy(t(n))$. Described more specifically, the CPU 11 moves the display start position of the printing image in the X-axis direction on the basis of the movement distance $sx(t(n))$, and moves the display start position of the printing image in the Y-axis direction on the basis of the movement distance $sy(t(n))$.

In the next step S131, the CPU 11 changes the size of the partial image area in the printing image on the basis of the movement distance sz(t(n)). Described more specifically, the CPU 11 increases the size of the partial image area with an increase of the movement distance sz(t(n)) in the positive z-axis direction, and reduces the size of the partial image area with an increase of the movement distance sz(t(n)) in the negative z-axis direction.

In the next step S133, the CPU 11 commands the display panel 18 to re-display the printing preview image in the partial image area. If the display start position of the partial image area in the printing image has been changed in step S129 in at least one of the X-axis and Y-axis directions, the position of the partial image area is moved in the X-Y plane defined for the printing image. Accordingly, the user can perform a scrolling operation of the printing preview image by moving the cellular phone 10 in the x-y plane defined for the display panel 18. Further, the user can enlarge (increase the size of) the printing preview image by moving the cellular phone 10 in the downward direction, that is, in the negative z-axis direction perpendicular to the x-y plane defined for the display panel 18, and contract (reduce the size of) the printing preview image by moving the cellular phone 10 in the upward direction, that is, in the positive z-axis direction perpendicular to the x-y plane.

It is noted that the steps S27, S29 and S31 in the control routine of the flow chart of FIG. 2 are repeatedly implemented at the period Δt while the "PREVIEW OPERATION" is kept touched. As the period Δt is reduced, the scrolling operation is smoothed, but a load of processing operations of the CPU 11 is increased. In this respect, the value of the period Δt is suitably determined depending upon the processing capacity of the CPU 11.

EXAMPLE

One example according to the first embodiment of this invention will be described, in the case where the printing data represent a document in which rows of characters extend in the horizontal direction. When the printing application 21a is started by the user, the printing image 201 indicated in FIG. 9 is obtained in step S21. As a result of the processing to determine the initial preview display state in step S23, the upper left point of origin of the printing image at which the first row of characters starts to extend is set at the display start position. Then, the initial printing preview image is displayed on the display panel in step S25, as shown in FIG. 9.

When the user touches the "PREVIEW OPERATION" button displayed on the display panel 18, namely, if the affirmative determination (YES) is obtained in step S29, the preview updating processing in step S31 is initiated. This preview updating process will be described in detail, by reference to FIG. 5. If the cellular phone 10 is moved in the rightward direction (in the positive x-axis direction) during a time period from the point of time t(1) to the point of time t(2), the velocity values represented by the velocity information vx(t(1)) and vy(t(1)) at the preceding point of time t(1) are zero. In step S113, the acceleration information ax(t(2))=A1, and ay(t(2))=0 at the present point of time t(2) are obtained. At the present point of time t(2) at which the cellular phone 10 has been moved in the rightward direction, only the acceleration information ax(t(2)) in the x-axis direction is detected.

In step S115, the change amount information dvx(t(2))=V1 is calculated. In step S117, the velocity information vx(t(2))=V is calculated. In step S119, the change amount information dvy(t(2))=0 is calculated. In step S121, the velocity information vy(t(2))=0 is calculated.

In step S127, the movement distance sx(t(2)) in the x-axis direction is calculated. The movement distance sx(t(2)) is represented by a surface area corresponding to an inclined line between the points of time t(1) and t(2), in a graph of the velocity information vx in the x-axis direction indicated in FIG. 5. Described more specifically, the movement distance sx(t(2)) is calculated according to the following Equation (3):

$$sx(t(2))=V1\times\Delta t/2 \qquad (3)$$

Figure 10:
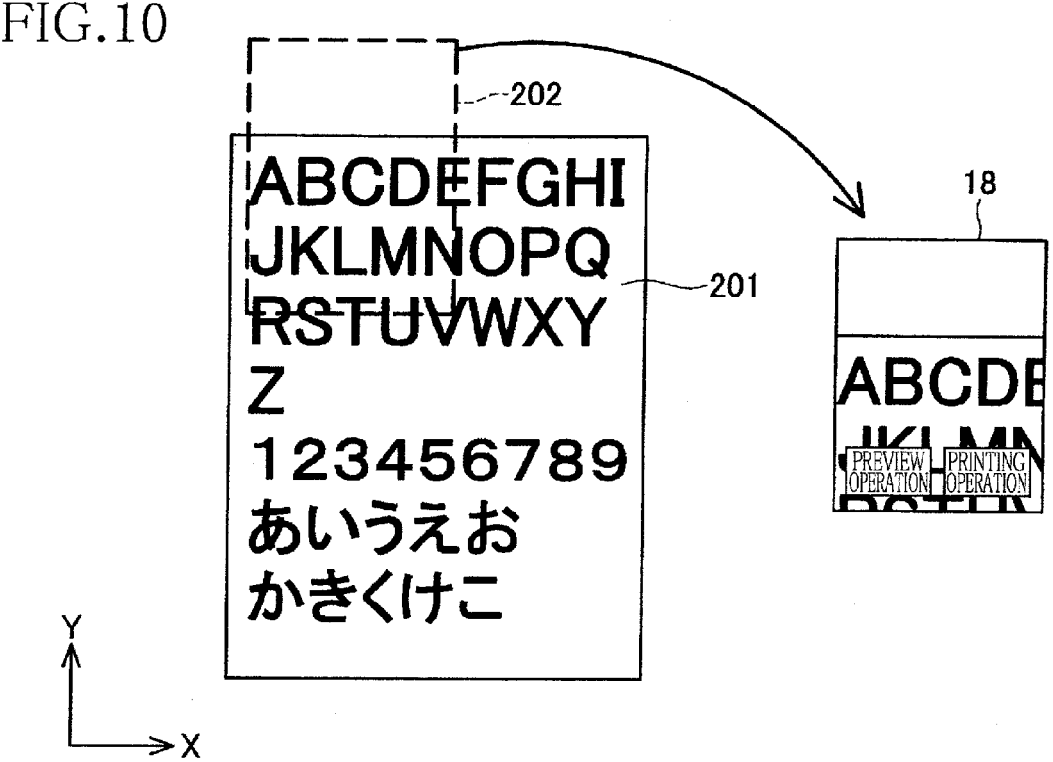
FIG. 10 is a view showing the printed image of FIG. 9, and another portion of this printed image.

In step S129, the partial image area 202 of the printing image 201 is moved in the positive X-axis direction on the basis of the movement distance sx(t(2)), as indicated in FIG. 10. In step S133, the printing preview image in the partial image area 202 is re-displayed on the display panel 18. Thus, the printing preview image on the display panel 18 is scrolled in the rightward direction, as indicated in FIG. 10.

Figure 5:
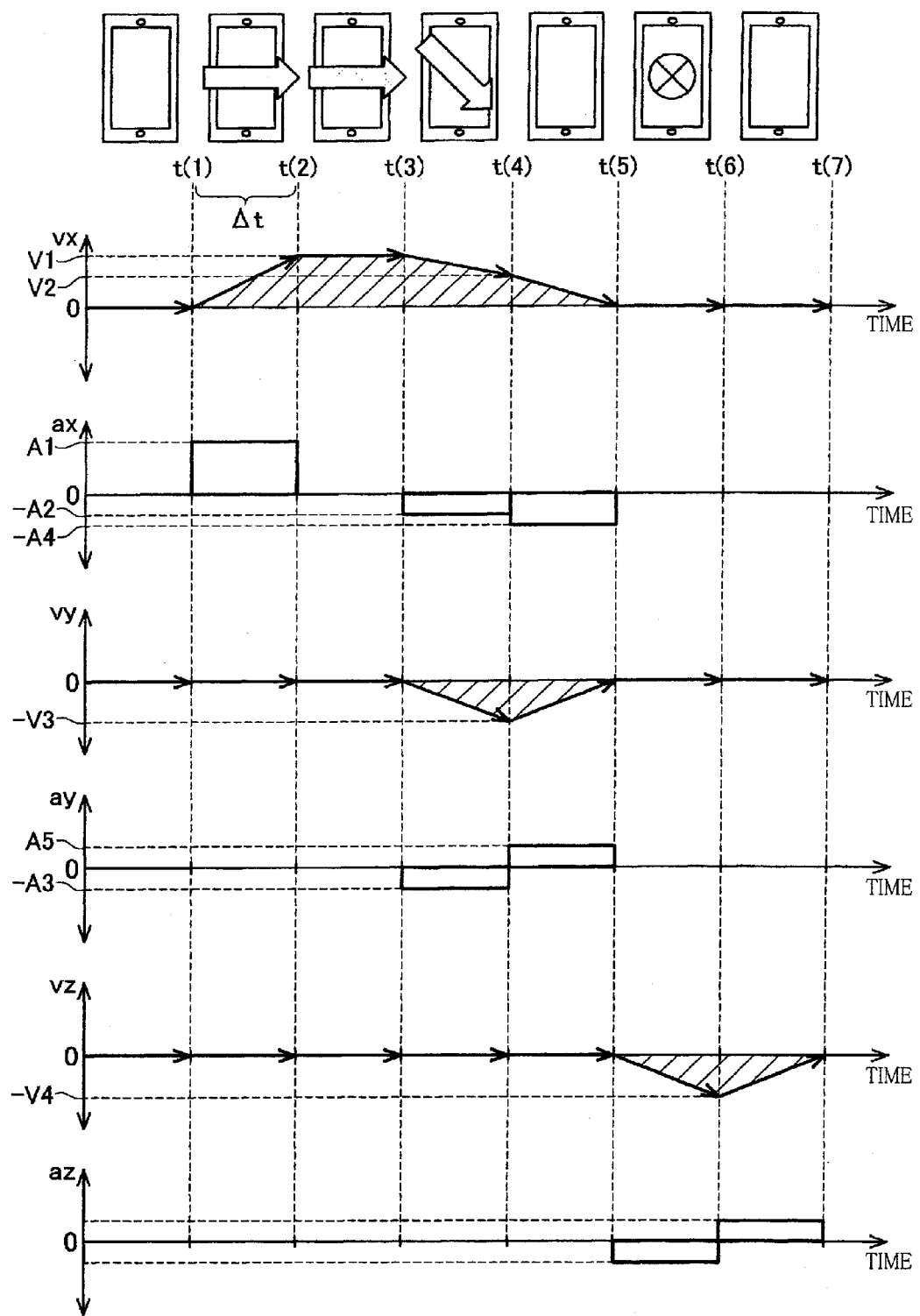
FIG. 5 is a view showing in detail a preview updating operation.

Then, the cellular phone 15 is moved at a constant velocity in the rightward direction (in the positive x-axis direction) during a time period from the point of time t(2) to the point of time t(3), as indicated in FIG. 5. In step S111, the velocity information vx(t(2))=V1, and vy(t(2))=0 is read out. The acceleration values represented by the acceleration information ax(t(3)) and ay(t(3)) at the point of time t(3) obtained in step S113 are both zero. In step S117, the velocity information vx(t(3))=V1 is calculated. In step S121, the velocity information vy(t(3))=0 is calculated.

In step S127, the movement distance sx(t(3)) in the x-axis direction is calculated. The movement distance sx(t(3)) is represented by a surface area corresponding to an inclined line between the points of time t(1) and t(3), in the graph of the velocity information vx in the x-axis direction indicated in FIG. 5. Described more specifically, the movement distance sx(t(3)) is calculated according to the following Equation (4):

$$sx(t(3))=V1\times\Delta t/2+V1\times\Delta t \qquad (4)$$

Figure 11:
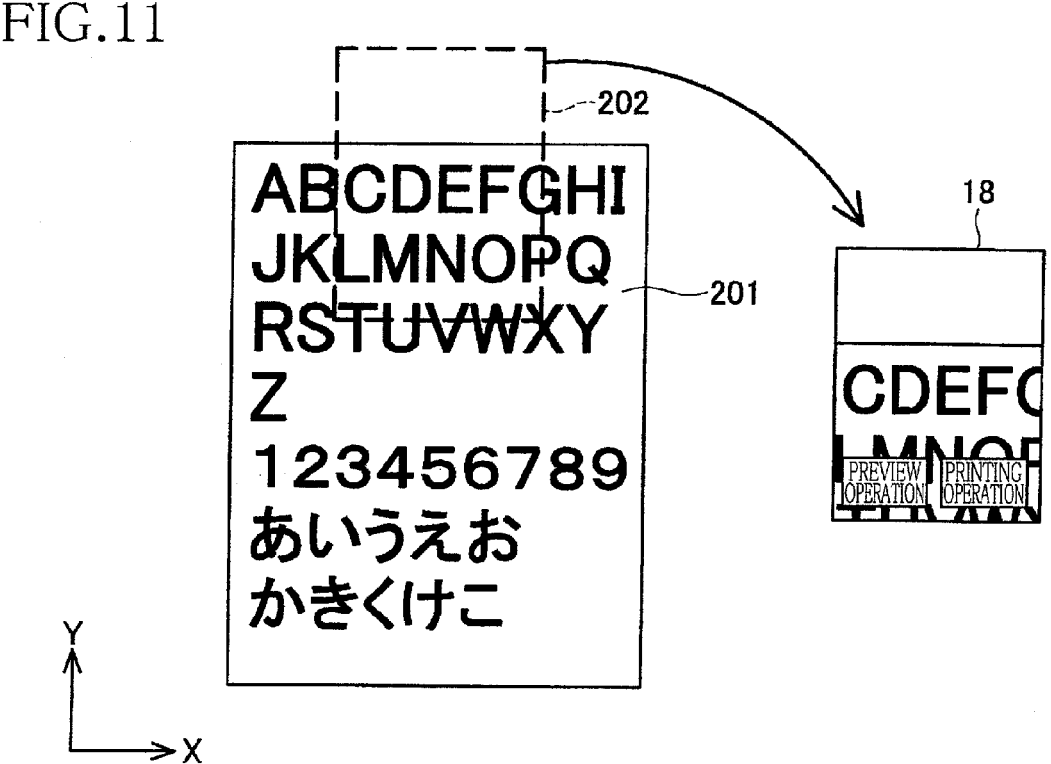
FIG. 11 is a view showing the printed image of FIG. 9, and a further portion of this printed image.

In step S129, the partial image area 202 of the printing image 201 is further moved in the positive X-axis direction on the basis of the movement distance sx(t(3)), as indicated in FIG. 11. In step S133, the printing preview image in the partial image area 202 is re-displayed on the display panel 18. Thus, the printing preview image on the display panel 18 is further scrolled in the rightward direction, as indicated in FIG. 11.

Then, the cellular phone 15 is moved at a constant velocity in a rightward and downward direction during a time period from the point of time t(3) to the point of time t(4), as indicated in FIG. 5. In step S111, the velocity information vx(t(3))=V1, and vy(t(2))=0 is read out. In step S113, the acceleration values represented by the acceleration information ax(t(4))=−A2, and ay(t(4))=−A3 at the point of time t(4) are obtained. In step S117, the velocity information vx(t(4))=V2 is calculated. In step S121, the velocity information vy(t(4))=−V3 is calculated.

In step S127, the movement distance sx(t(4)) in the x-axis direction is calculated. The movement distance sx(t(4)) is represented by a surface area corresponding to an inclined line between the points of time t(1) and t(4), in the graph of the velocity information vx in the x-axis direction indicated in FIG. 5. Described more specifically, the movement distance sx(t(4)) is calculated according to the following Equation (5):

$$sx(t(4))=V1\times\Delta t/2+V1\times\Delta t+[(V1-V2)\times\Delta t/2+V2\times\Delta t] \qquad (5)$$

Further, the movement distance sy(t(4)) in the y-axis direction is calculated. The movement distance sx(t(4)) is represented by a surface area corresponding to an inclined line between the points of time t(3) and t(4), in the graph of the velocity information vx in the x-axis direction indicated in FIG. 5. Described more specifically, the movement distance sx(t(4)) is calculated according to the following Equation (6):

$$sy(t(4))=V3 \times \Delta t/2 \quad (6)$$

Figure 12:
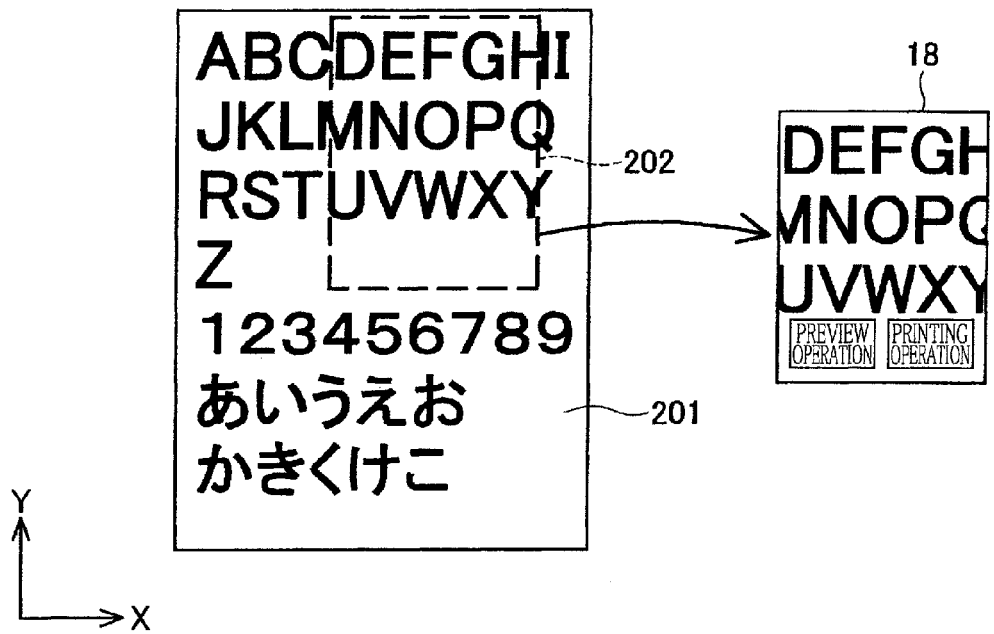
FIG. 12 is a view showing the printed image of FIG. 9, and a still further portion of this printed image.

In step S129, the partial image area 202 of the printing image 201 is further moved in the positive X-axis direction on the basis of the movement distance sx(t(4)), and is moved in the negative Y-axis direction on the basis of the movement distance sy(t(4)), as indicated in FIG. 12. In step S133, the printing preview image in the partial image area 202 is re-displayed on the display panel 18. Thus, the printing preview image on the display panel 18 is further scrolled in the rightward and downward direction, as indicated in FIG. 12.

Then, the cellular phone 15 is held stationary during a time period from the point of time t(4) to the point of time t(5), as indicated in FIG. 5. In step S111, the velocity information vx(t(4))=V2, and vy(t(4))=−V3 is read out. In step S113, the acceleration values represented by the acceleration information ax(t(5))=−A4, and ay(t(5))=A5 at the point of time t(5) are obtained. In step S117, the velocity information vx(t(5))=0 is calculated. In step S121, the velocity information vy(t(5))=0 is calculated.

In step S127, the movement distances sx(t(5)) and sy(t(5)) are calculated. These movement distances sx(t(5)) and sy(t5)) are calculated according equations similar to those described above.

Figure 13:
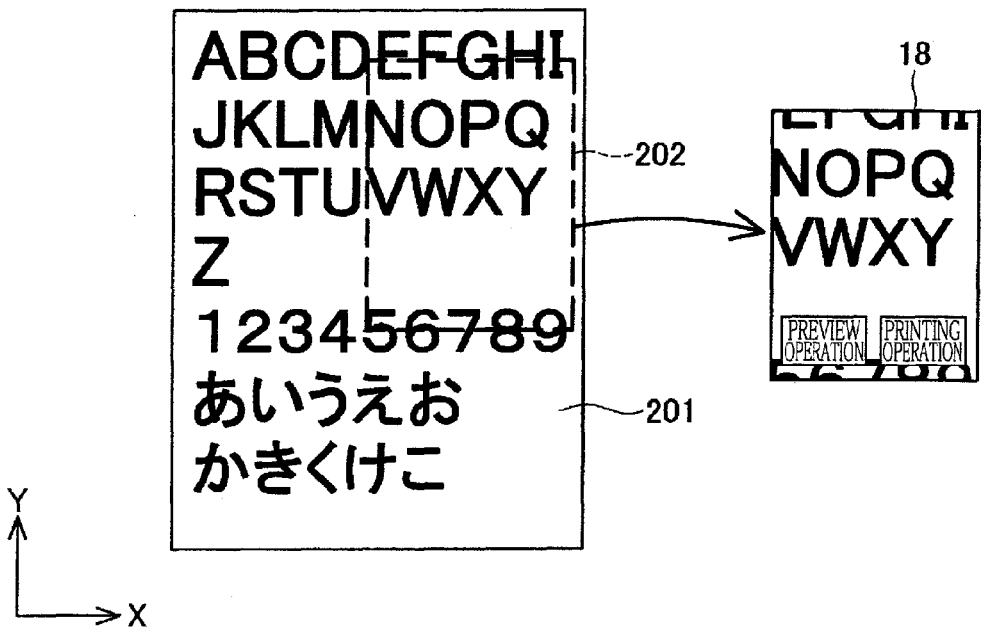
FIG. 13 is a view showing the printed image of FIG. 9, and still another portion of this printed image.

In step S129, the position of the partial image area 202 within the printing image 201 is changed on the basis of the movement distances sx(t(5)) and sy(t(5)), as indicated in FIG. 13. In step S133, the printing preview image in the partial image area 202 is re-displayed on the display panel 18. Thus, the scrolling operation of the printing preview image displayed on the display panel 18 is stopped at the state indicated in FIG. 13.

Then, the cellular phone 10 is moved in the downward direction perpendicular to the horizontal plane, during a time period between the points of time t(5) and t(6), and is then held stationary during a time period between the points of time t(6) and t(7). In this case, the movement distance sz(t(7)) is calculated The movement distance sz(t(7)) is represented by a surface area corresponding to an inclined line between the points of time t(5) and t(7), in a graph of the velocity information vz in the z-axis direction indicated in FIG. 5. Described more specifically, the movement distance sz(t(7)) is calculated according to the following Equation (7):

$$sz(t(7))=V4 \times \Delta t/2+V4 \times \Delta t/2 \quad (7)$$

Figure 14:
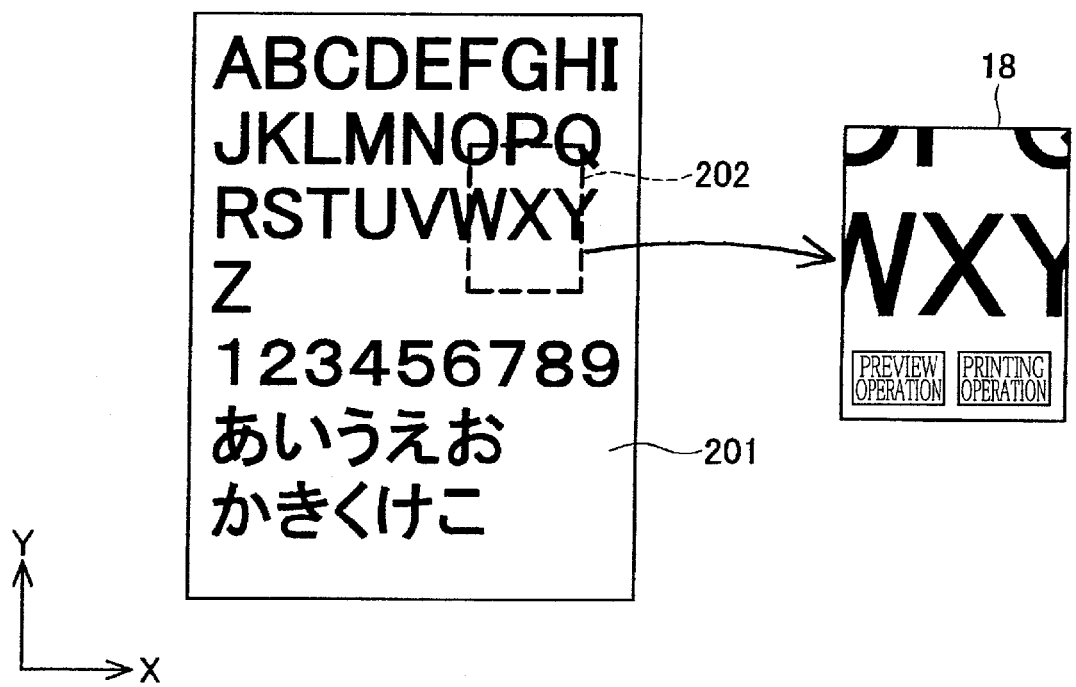
FIG. 14 is a view showing the printed image of FIG. 9, and a still further portion of this printed image.

In step S131, the size of the partial image area 202 in the printing image 201 is increased on the basis of the movement distance sz(t(7)), as indicated in FIG. 14. In step S133, the printing preview image in the partial image area 202 is re-displayed on the display panel 18. Thus, the printing preview image displayed on the display panel 18 is enlarged as indicated in FIG. 14.

(Advantages)

In the cellular phone 10 configured according to the present embodiment, the acceleration value of the cellular phone 10 is obtained by the acceleration sensor 26, and the printing preview image displayed on the display panel 18 can be scrolled on the basis of the obtained acceleration value. Namely, the scrolling operation can be performed by simply accelerating the cellular phone 10, without having to use a specific assisting device such as a guide sheet conventionally used, whereby the cellular phone 10 can be more easily operated by the user.

The cellular phone 10 according to the present embodiment is further configured such that the velocity information vx and vy of the cellular phone 10 can be calculated on the basis of the direction and magnitude of the acceleration measured by the acceleration sensor 26. In addition, the position and size of the partial image area in the printing image can be changed on the basis of the velocity information vx and vz. By measuring the acceleration of the cellular phone 10, it is difficult to distinguish a movement of the cellular phone 10 at a constant speed, and the stationary state of the cellular phone 10, from each other, since the acceleration value is zero when the cellular phone 10 is moved at the constant speed and when it is held stationary. By using the velocity information, however, it is possible to clearly distinguish the constant-speed movement and the stationary state of the cellular phone 15 from each other, so that the printing preview image can be more accurately scrolled and enlarged or reduced.

In addition, the cellular phone 10 according to the present embodiment is configured to permit the scrolling operation and enlargement or contraction of the printing preview image only while the "PREVIEW OPERATION" button is held touched by the user. That is, the user can scroll the printing preview image only when the user has an intention to do so. Unless the "PREVIEW OPERATION" button is held touched by the user, the printing preview image is prevented from being scrolled even if the cellular phone 10 is accelerated without an intention to scroll the printing preview image. Thus, it is possible to prevent erroneous operations of the cellular phone 10 by the user.

Further, the cellular phone 10 according to the present invention 10 is configured such that where the printing data are document data, rows of characters in a document represented by the document data are displayed on the display panel 18, in the same font size as the font size specified by the document data. Accordingly, a relevant part of the document as printed can be checked by the printing preview image displayed on the display panel 18, in terms of the width of each character row and the area of the printed part, as if a recording medium having a printed image existed just behind the display panel 18. Thus, the user can intuitively see how the character rows being displayed on the display panel 18 are actually printed on the recording medium.

While the preferred embodiment of the present invention has been described above by reference to the drawings, for illustrative purpose only, it is to be understood that the present invention is not limited to the details of the illustrated embodiment, but may be embodied with various changes and modifications such as those described below, which may occur to those skilled in the art, without departing from the spirit and scope of the invention defined in the appended claims.

(First Modification)

Figure 6:
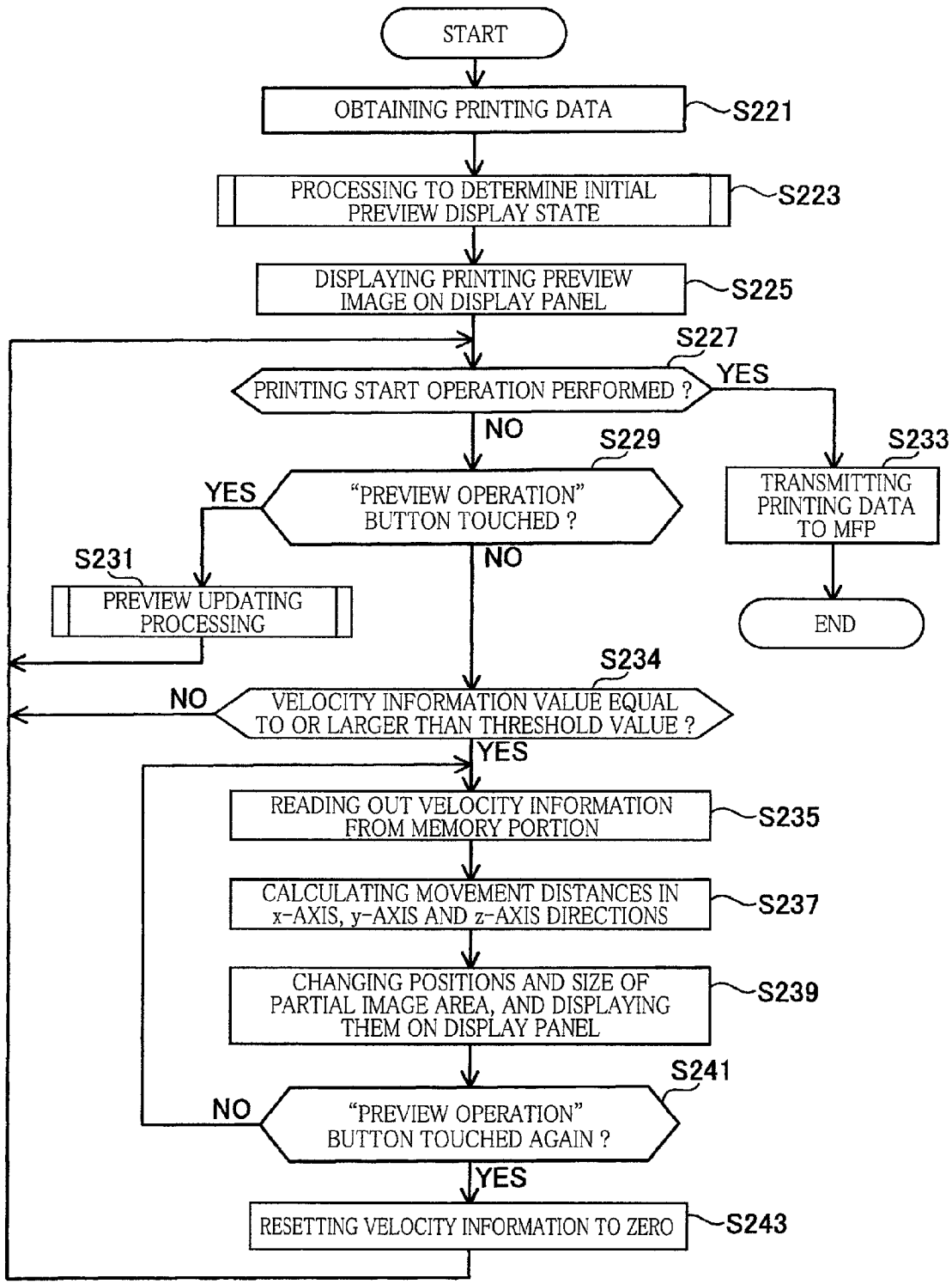
FIG. 6 is a flow chart illustrating another control routine of the cellular phone.

Referring to the flow chart of FIG. 6, one modification of the preview updating processing will be described. In this modification, the state of scrolling of the printing preview image at the time when a finger of the user has released the "PREVIEW OPERATION" button is maintained (continued), if the finger is released from the button during a scrolling operation of the printing preview image by moving the cellular phone 15 while the "PREVIEW OPERATION" button is kept touched by the finger. When the "PREVIEW OPERATION" button is again touched by the finger while the printing preview image is being scrolled, the scrolling operation is stopped. Steps S221 through S233 in the flow chart of FIG. 6 are identical with steps S21 through S33 in the flow chart of FIG. 2, and will not be described in detail.

In step S229, the CPU 11 determines whether the "PREVIEW OPERATION" button displayed on the display panel 18 is touched by the user. If the button is touched, that is, if an affirmative determination (YES) is obtained in step S229, the control flow goes to step S231. If the button is not touched, that is, if a negative determination (NO) is obtained in step S229, the control flow goes to S234. In step S234, the CPU 11 obtains the velocity information vx(t(n)) and vz(t(n)) at the present point of time t(n), and determines whether at least one of absolute values of the velocities represented by the obtained velocity information vx(t(n)) and vz(t(n)) is equal to or larger than a corresponding one of predetermined threshold values stored in a threshold value memory area 12a. If none of the absolute values are equal to or larger than the corresponding threshold values, that is, if a negative determination (NO) is obtained in step S234, the control flow goes back to step S227. If at least one of the absolute values is equal to or larger than the corresponding threshold value, that is, if an affirmative determination (YES) is obtained in step S234, the control flow goes to step S235 after the obtained velocity information vx(t(n)) and vz(t(n)) is temporarily stored in the memory portion 12.

In step S235, the CPU 11 reads out the velocity information vx(t(n)) and vz(t(n)) from the memory portion 12. In step S237, the CPU 11 calculates the movement distances sx(t(n)), sy(t(n)) and sz(t(n)), which are distances of movement of the cellular phone 10 at the velocities represented by the velocity information vx(t(n)), vy(t(n)) and vz(t(n)) at a reference point of time (at which the user has released the "PREVIEW OPERATION" button, namely, at which the negative determination (NO) is obtained in step S229), during a time period between the reference point of time and the present point of time t(n).

In step S239, the CPU 11 changes the position or size of the partial image area in the printing image, on the basis of the movement distances sx(t(n)) and sz(t(n)), and commands the display panel 18 to re-display the printing preview image in the partial image 202 area in the printing image.

In step S241, the CPU 11 determines whether the "PREVIEW OPERATION" button has been touched again by the user. If the button has been touched again by the user, that is, if a negative determination (NO) is obtained in step S241, the control flow goes back to step S235. If the button has been touched again by the user, that is, if an affirmative determination (YES) is obtained in step S241, the control flow goes to step S243 in which the CPU 11 resets all values of the velocity information vx(t(n)), vy(t(n)) and vz(t(n)) stored I the memory portion 12, and then goes back to step S227.

In the cellular phone configured according to the present modification, the printing preview image can be kept scrolled as if the cellular phone 10 is moved at a constant velocity equal to the velocity at the time when the finger of the user has released the "PREVIEW OPERATION" button, if the finger releases the button while the cellular phone 15 is moved with the "PREVIEW OPERATION" button being kept touched by the finger. When the "PREVIEW OPERATION" button is touched again by the user, the constant scrolling state is canceled and stopped. Accordingly, the printing preview image can be scrolled by a long distance with a short distance of movement of the cellular phone 10. Thus, the scrolling operation can be easily performed even when the required distance of scrolling is relatively long, as in the case where the size of the printing image is relatively large.

The cellular phone 10 is more or less moved when the cellular phone 10 is operated by the user. This means that the velocity information representative of the velocity of movement of the cellular phone 10 more or less includes a noise component. In the cellular phone 10 according to the present modification, however, the processing to continuously scroll the printing preview image is initiated when the velocity of movement of the cellular phone 10 at the time when the finger of the user has released the "PREVIEW OPERATION" button is equal to or higher than the threshold value (when the affirmative determination (YES) is obtained in step S234). Accordingly, the noise component can be removed from the velocity information, so that the erroneous operation of the cellular phone 10 by the user can be prevented.

(Second Modification)

A physical quantity used to control the scrolling operation of the printing preview image is not limited to the acceleration value of the cellular phone 10 measured by the acceleration sensor 26 used in the illustrated embodiment described above. For example, the acceleration value may be replaced by an angle of inclination of the cellular phone 10 measured by the inclination sensor 29. This modification will be described below.

In the present second modification, the control routine illustrated in the flow chart of FIG. 4 is modified as described below. Namely, step S113 is modified such that the CPU 11 obtains inclination angle information gx(t(n)) and gy(t(n)) at the present point of time t(n). Step S117 is modified to calculate a product of an inclination angle represented by the inclination angle information gx(t(n)) and the period Δt, while step S121 is modified to calculate a product of an inclination angle represented by the inclination angle information gy(t(n)) and the period Δt. Step S127 is modified to calculate the movement distance sx(t(n)) on the basis of the product calculated in step S117, and the movement distance sy(t(n)) on the basis of the product calculated in step S121. Step S129 is modified to change the position of the partial image area in the printing image, on the basis of the movement distances sx(t(n)) and gy((n)). Step S133 is modified to re-display the printing preview image in the partial image area 202, on the display panel 18.

In the cellular phone 10 according to the present second embodiment, the position of the partial image area in the printing image can be changed according to the angle of inclination of the cellular phone 10 measured by the inclination sensor 29. Accordingly, the user can perform the scrolling operation of the printing preview image by inclining the x-y plane defined of the display panel 18 with respect to the horizontal plane.

(Third Modification)

The acceleration value measured by the acceleration sensor 26 and used to control the scrolling operation of the printing preview image may be replaced by the position of the cellular phone 10 obtained by the GPS portion 30. This modification will be described below.

In the present third modification, the control routine of the flow chart of FIG. 4 is modified as described below. Namely, the position of the cellular phone 10 measured by the GPS portion 30 at the point of time when the "PREVIEW OPERATION" button is touched is determined as the reference position of the cellular phone 10. Steps 111-S125 are eliminated, and step S127 is modified to calculate the movement distances sx(t(n)) and sy(t(n)) on the basis of the present position of the cellular phone 10 measured by the GPS portion 30. Step S129 is implemented to change the position of the partial image area in the printing image, on the basis of the calculated movement distances sx(t(n)) and sy(t(n)), and step S133 is implemented to re-display the printing preview image in the partial image area 202.

In the cellular phone 10 according to the present third modification, the position of the partial image area in the printing image can be changed on the basis of the positional information of the cellular phone 10 obtained by the GPS portion 30.

(Other Modifications)

The illustrated embodiment may be modified such that the operations to scroll, enlarge and contract the printing preview image are possible only while the cellular phone 10 is placed in a predetermined state, for instance, only while any part of the display panel 18 is kept touched, or only while the display panel 18 is kept in an almost horizontal or vertical plane, or kept inclined at about 45.° with respect to the horizontal or vertical plane.

Further, the illustrated embodiment may be modified to command a motion sensor to return detected information, through the API of the operating system 21e, only while the cellular phone 10 is placed in a predetermined state. Further, the cellular phone 10 may be designed such that the motion sensor generates the detected information only while the cellular phone 10 is placed in a predetermined state. Described more specifically, step S113 in the flow chart of FIG. 4 may be modified to obtain the acceleration information from the motion sensor in the form of the acceleration sensor 26, only while the "PREVIEW OPERATION" button is kept touched by the user. Thus, the output of the motion sensor is obtained only while the cellular phone 10 is kept in the predetermined state.

The illustrated embodiment may be modified to display the printing preview image in the partial image area 202, only while the cellular phone 10 is placed in a predetermined state. Described more specifically, steps S111-S131 in the flow chart of FIG. 4 are implemented if the printing start operation has not been performed, that is, if the negative determination (NO) is obtained in step S27 in the flow chart of FIG. 2. If the "PREVIEW OPERATION" button is touched by the user, that is, if the affirmative determination (YES) is obtained in step S29, the printing preview image is displayed in the display panel 18 in step S133. In this case, steps S111-S131 (in FIG. 4) can be implemented in advance, making it possible to reduce the time required to display the printing preview image on the display panel 18, as compared with the required time where steps S111-S131 are initiated only after the cellular phone 10 is placed in the predetermined state.

While the embodiment and its modifications use an output of the motion sensor such as the acceleration sensor 26, inclination sensor 25 and GPS portion 30 to scroll, enlarge and contract the displayed image, the displayed image may be scrolled, enlarged and reduced on the basis of a detector configured to detect a pinching motion of two fingers of the user and/or a flicking motion of a finger of the user with respect to the display panel 18, as well as the output of the above-indicated motion sensor. In this case, the partial image area 202 may be specified on the basis of the output of the motion sensor (detected information) generated while the pinching or flicking motion is not performed with respect to the display panel 18. Conversely, the partial image area 202 may be specified on the basis of the output of the detector indicative of the pinching or flicking motion, while the output of the motion sensor is not generated. Thus, a movement of the cellular phone 10 and a finger operation with respect to the display panel 18 can be both utilized to scroll the displayed image.

The manner of image scrolling, enlarging and contracting operations according to the present invention is applicable to various kinds of image other than the printing image, for instance, to an image to be displayed on the display panel 18 according to web data, using the browser application 21b.

The x-axis, y-axis and z-axis directions of the acceleration value can be defined in various manners other than the manner in which the directions are defined with respect to the display panel 18. For example, the directions may be defined such that a horizontal plane detected by the inclination sensor 29 is defined as the x-y plane, or such that the vertical direction is defined as the z-axis direction. In this case, the printing preview image can be scrolled, enlarged and reduced by moving the cellular phone 10 in the horizontal plane, irrespective of the orientation of the cellular phone 10 in the horizontal plane about the z-axis.

Further, the printing data may be obtained in step S21 in various manners. For instance, the printing data may be obtained through the wireless communication 211, or from a non-volatile memory inserted in a memory slot provided in the cellular phone 10.

The principle of the present invention is applicable to any portable device other than the cellular phone 10, for example, to a note type personal computer or a tablet device.

While the "PRINTING OPERATION" button and "PREVIEW OPERATION" button are displayed on the touch-type display panel 18, the buttons may be provided in the form of hardware keys in the cellular phone 10.

While an image of 600 dpi is printed on an A4-size recording medium in the illustrated embodiment, an image of any other desired resolution may be printed on a recording medium of any other size. In the illustrated embodiment, the display panel 18 has a display resolution of 480 dots×640 dots. However, the display panel 18 has any other display resolution. Although the printing preview image is displayed on the display panel 18, in a display area having a point of origin (0 dot, 0 dot) and an end point (480 dot, 640 dot) in the illustrated embodiment, the printing preview image is displayed in a display area having an upper left point of origin (0 dot, 640 dot) and a lower right end point (480 dot, 0 dot) when the cellular phone 10 is positioned with its width direction parallel to the user's line of view toward the display panel 18 such that the aperture of the microphone 4 is located on the left side while the aperture of the speaker 3 is located on the right side. Alternatively, the display area of the display panel 18 has an upper left point of original (480 dot, 0 dot) and a lower right end point (0 dot, 640 dot) when the cellular phone 10 is positioned such that the aperture of the microphone 4 is located on the right side while the aperture of the speaker 3 is located on the left side. Thus, the printing preview image can be displayed in the appropriate display area of the display panel 18 according to the orientation of the cellular phone 10 about the z-axis.

In the illustrated embodiment, the printing preview image corresponding to the upper left corner portion 202 of the printing image 201 is displayed as the initial preview image in the central area of the display area of the display panel 18. However, the initial preview image corresponding to the upper left corner portion 202 of the printing image 201 may be displayed in the upper left corner portion of the display area of the display panel 18. In the illustrated embodiment, the upper left point of origin of the printing image 201 is selected as the display start position where the printing data represent the document having horizontal rows of characters. Where the printing data represent a document having vertical rows of characters, the upper right point of origin of the printing image 201 may be selected as the display start position. In this case, step S25 is implemented to display bit map data within the partial image area 202 on the display panel 18, in a display area having the upper right point of origin (Xdevmin=480, Ydevmin=0) and the lower left end point (Xdevmax=0, Ydevmax=640), using the API provided by the operating system 21e. In this case, the printing preview image can be displayed in an appropriate manner according to the document having the vertical rows of characters.

Although the illustrated embodiment is configured to select the upper left point of origin of the printing image 201 as the printing start position where the printing data represent a document, the illustrated embodiment may be modified to detect an area of the printing image represented by the printing data, in which characters are detected, and to select the position of this area as the display start position. In this case, the detected characters are included in the initial preview image displayed on the display panel 18. While the partial image area 202 is specified by the display start position and the size in the illustrated embodiment, the partial image area 202 may be specified by the display start position, and a display end position within the printing image at which the display of the printing preview image is terminated.

It is to be understood that the present invention is not limited to combinations of technical elements or features described in the appended claims, but may be practiced with various technical features disclosed in the specification and the accompanying drawings, which technical features are useful alone or in combination. It is to be further understood that the technical features disclosed in the specification and drawings for illustrative purpose can achieve a plurality of objects at the same time, and that the invention is useful as long as at least one of those objects is achieved.

What is claimed is:

1. A non-transitory storage medium storing computer-readable instructions readable by a computer of a portable device including a sensor configured to output sensor information corresponding to a movement and an attitude of the portable device, a data memory portion configured to store image data, and a display portion configured to display an image on the basis of the image data, wherein, when executed by the computer of the portable device, the computer-readable instructions instruct the computer to function as:

a sensor-information obtaining portion configured to obtain the sensor information;

a partial area specifying portion configured to specify, as a partial image area, an area of a partial image that is a portion of the image represented by the image data, on the basis of the obtained sensor information;

a display control portion configured to command the display portion to display the partial image corresponding to the partial image area specified by the partial area specifying portion; and a first state judging portion configured to judge whether the obtained sensor information indicates a state in which the portable device is kept inclined at a predetermined angle with respect to a horizontal plane, wherein the partial area specifying portion is configured to specify, while the display portion displays a first partial image as the partial image, a second partial image area on the basis of the sensor information outputted in response to the movement of the portable device, the second partial image area corresponding to a portion of the image represented by the image data that is located at a position different from a position of a first partial image area corresponding to the first partial image, wherein, when the first state judging portion judges that the obtained sensor information indicates the state in which the portable device is kept inclined at the predetermined angle with respect to the horizontal plane, the display control portion is configured to command the display portion to perform a scrolling processing such that the display portion displays a second partial image corresponding to the second partial image area specified by the partial area specifying portion on the basis of the sensor information outputted in response to the movement of the portable device, wherein, when the first state judging portion judges that the obtained sensor information does not indicate the state in which the portable device is kept inclined at the predetermined angle with respect to the horizontal plane, the display control portion is configured not to command the display portion to perform the scrolling processing on the basis of the sensor information outputted in response to the movement of the portable device, wherein the first state judging portion is further configured to judge whether the image data includes data representing characters, and wherein, when the first state judging portion judges that the image data includes the data representing characters, the display control portion is configured to command the display portion to display the partial image corresponding to the partial image area, which is not an entire area of the image represented by the image data.

2. The non-transitory storage medium according to claim 1, wherein said display portion is provided on a first surface that is one surface of a housing of the portable device, and wherein, while the display portion displays the first partial image as the partial image, the partial area specifying portion is configured to specify the second partial image area on the basis of the outputted sensor information indicative of the movement of the portable device in a first direction parallel to the first surface.

3. The non-transitory storage medium according to claim 2, wherein the partial area specifying portion is configured to specify, as the second partial image area, the area of the partial image which is shifted from the position of the first partial image area in a positive direction, when the outputted sensor information indicates the movement of the portable device in one of opposite directions parallel to the first direction parallel to the first surface, and in a negative direction opposite to the positive direction, when the outputted sensor information indicates the movement of the portable device in the other of the opposite directions parallel to the first direction parallel to the first surface.

4. The non-transitory storage medium according to claim 2, wherein the outputted sensor information includes a direction and a magnitude of acceleration of the portable device, and wherein the partial area specifying portion is configured to calculate a velocity of the movement of the portable device on the basis of the direction and the magnitude of the acceleration, and to specify the second partial image area on the basis of the calculated velocity of the movement.

5. The non-transitory storage medium according to claim 1, wherein the display portion is provided on a first surface that is one surface of a housing of the portable device, wherein, while the display portion displays the first partial image as the partial image, the partial area specifying portion is configured to specify, as a third partial image area, an area of a partial image which is a portion of the image represented by the image data and which is enlarged or reduced with respect to the first partial image area, and to specify the second partial image area on the basis of the outputted sensor information indicative of the movement of the portable device in a direction of thickness of the housing perpendicular to the first surface of the housing, and wherein the display control portion is configured to command, when the partial area specifying portion specifies the third partial image area, the display portion to display a third partial image corresponding to the third partial image area specified by the partial area specifying portion.

6. The non-transitory storage medium according to claim 5, wherein the partial area specifying portion is configured to specify, as the third partial image area, the area of the partial image enlarged with respect to the first partial image area, when the outputted sensor information indicates the movement of the portable device in one of opposite directions parallel to the direction of thickness of the housing, and the area of the partial image reduced with respect to the first partial image area, when the outputted sensor information indicates the movement of the portable device in the other of the opposite directions parallel to the direction of thickness of the housing.

7. The non-transitory storage medium according to claim 1,
wherein the display portion is provided on a first surface that is one of surfaces of a housing of the portable device,
wherein, while the display portion displays the first partial image as the partial image, the partial area specifying portion is configured to specify, the second partial image area on the basis of the outputted sensor information indicative of angles of inclination of the portable device with respect to a direction of an axis parallel to the first surface and another axis parallel to the first surface, and
wherein the display control portion is configured to command the display device to display the second partial image corresponding to the second partial image area specified by the partial area specifying portion.

8. The non-transitory storage medium according to claim 7, wherein, while the display portion displays the first partial image, the partial area specifying portion is configured to specify, as the second partial image area, an area of the partial image which is a portion of the image represented by the image data and which is enlarged or reduced with respect to the first partial image area, and to specify the second partial image area on the basis of the outputted sensor information indicative of the movement of the portable device in a direction of thickness of the housing perpendicular to the first surface of the housing, and
wherein the display control portion is configured to command the display device to display the second partial image corresponding to the second partial image area specified by the partial area specifying portion.

9. The non-transitory storage medium according to claim 1,
wherein the first state judging portion is further configured to judge whether a predetermined operation button of the portable device is kept touched, and
wherein the partial area specifying portion is configured to specify the second partial image area when the first state judging portion judges that the obtained sensor information indicates the state in which the portable device is kept inclined at the predetermined angle and that the predetermined operation button is kept touched.

10. The non-transitory storage medium according to claim 9,
wherein the display control portion is configured to command the display portion to display the second partial image corresponding to the second partial image area when the first state judging portion judges that the predetermined operation button is kept touched, and
wherein the display control portion is configured to command the display portion to not display the second partial image on the display portion when the first state judging portion judges that the predetermined operation button is not kept touched.

11. The non-transitory storage medium according to claim 1,
wherein, when executed by the computer of the portable device, the computer-readable instructions further instruct the computer to function as an input receiving portion configured to receive a manual operation of the portable device, and
wherein the partial area specifying portion is configured to specify the partial image area on the basis of the obtained sensor information when the input receiving portion is not currently receiving the manual operation, and
wherein the partial area specifying portion is configured to specify the partial image area on the basis of the manual operation while the input receiving portion receives the manual operation.

12. A method of controlling a portable device including a sensor configured to output sensor information corresponding to a movement and an attitude of the portable device, a data memory portion configured to store image data, and a display portion configured to display an image on the basis of the image data, the method comprising:
obtaining the sensor information;
performing a specifying processing to specify, as a partial image area, an area of a partial image that is a portion of the image represented by the image data, on the basis of the obtained sensor information;
performing a commanding processing to command the display portion to display the partial image corresponding to the partial image area; and
judging whether the obtained sensor information indicates a state in which the portable device is kept inclined at a predetermined angle with respect to a horizontal plane,
wherein the specifying processing includes specifying, while the display portion displays a first partial image as the partial image, a second partial image area on the basis of the sensor information outputted in response to the movement of the portable device, the second partial image area corresponding to a portion of the image represented by the image data that is located at a position different from a position of a first partial image area corresponding to the first partial image,
wherein, when it is judged that the obtained sensor information indicates the state in which the portable device is kept inclined at the predetermined angle with respect to the horizontal plane, the commanding processing includes commanding the display portion to perform a scrolling processing such that the display portion displays a second partial image corresponding to the second partial image area specified in the specifying processing on the basis of the sensor information outputted in response to the movement of the portable device,
wherein, when it is judged that the obtained sensor information does not indicate the state in which the portable device is kept inclined at the predetermined angle with respect to the horizontal plane, the commanding processing does not include commanding the display portion to perform the scrolling processing on the basis of the sensor information outputted in response to the movement of the portable device, and wherein the method further comprises:
judging whether the image data includes data representing characters,
wherein, when it is judged that the image data includes the data representing characters, the commanding processing includes commanding the display portion to display the partial image corresponding to the partial image area, which is not an entire area of the image represented by the image data.

13. A portable device comprising:
a sensor configured to output sensor information corresponding to a movement and an attitude of the portable device;
a data memory portion configured to store image data;
a display portion configured to display an image on the basis of the image data;
a sensor-information obtaining portion configured to obtain the sensor information;
a partial area specifying portion configured to specify, as a partial image area, an area of a partial image that is a portion of the image represented by the image data, on the basis of the obtained sensor information;
a display control portion configured to command the display portion to display the partial image corresponding to the partial image area specified by the partial area specifying portion; and
a first state judging portion configured to judge whether the obtained sensor information indicates a state in which the portable device is kept inclined at a predetermined angle with respect to a horizontal plane,
wherein the partial area specifying portion is configured to specify, while the display portion displays a first partial image as the partial image, a second partial image area on the basis of the sensor information outputted in response to the movement of the portable device, the second image area corresponding to a portion of the image represented by the image data that is located at a position different from a position of a first partial image area corresponding to the first partial image,
wherein, when the first state judging portion judges that the obtained sensor information indicates the state in which the portable device is kept inclined at the predetermined angle with respect to the horizontal plane, the display control portion is configured to command the display portion to perform a scrolling processing such that the display portion displays a second partial image corresponding to the second partial image area specified by the partial area specifying portion on the basis of the sensor information outputted in response to the movement of the portable device,
wherein, when the first state judging portion judges that the obtained sensor information does not indicate the state in which the portable device is kept inclined at the predetermined angle with respect to the horizontal plane, the display control portion is configured not to command the display portion to perform the scrolling processing on the basis of the sensor information outputted in response to the movement of the portable device,
wherein the first state judging portion is further configured to judge whether the image data includes data representing characters, and
wherein, when the first state judging portion judges that the image data includes the data representing characters, the display control portion is configured to command the display portion to display the partial image corresponding to the partial image area, which is not an entire area of the image represented by the image data.

14. A non-transitory storage medium storing computer-readable instructions readable by a computer of a portable device including a sensor configured to output sensor information corresponding to at least one of a movement and an attitude of the portable device, a data memory portion configured to store image data, and a display portion configured to display an image on the basis of the image data, wherein, when executed by the computer of the portable device, the computer-readable instructions instruct the computer to function as:
a sensor-information obtaining portion configured to obtain the sensor information;
a partial area specifying portion configured to specify, as a partial image area, an area of a partial image that is a portion of the image represented by the image data, on the basis of the obtained sensor information;
a display control portion configured to command the display portion to display the partial image corresponding to the partial image area specified by the partial area specifying portion;
a first state judging portion configured to judge whether the image data includes data representing characters,
wherein, when the first state judging portion judges that the image data includes the data representing characters, the display control portion is configured to command the display portion to display the partial image area, which is not an entire area of the image represented by the image data, and
wherein, when the first state judging portion judges that the image data does not include the data representing characters, the display control portion is configured to command the display portion to display the partial image area, which is the entire area of the image represented by the image data.

15. The non-transitory storage medium according to claim 14, wherein the display control portion is configured to command the display portion to display the partial image, which is specified when the first state judging portion judges that the image data includes the data representing characters, such that a size of the characters included in the partial image displayed on the display portion is substantially equal to a size of the characters in the image printed on a recording medium.

* * * * *